(12) United States Patent
Burroughs et al.

(10) Patent No.: US 12,729,870 B2
(45) Date of Patent: Sep. 8, 2026

(54) VARIABLE REFRIGERANT FLOW SYSTEM WITH ZONE GROUPING

(71) Applicant: Johnson Controls Tyco IP Holdings LLP, Milwaukee, WI (US)

(72) Inventors: John H. Burroughs, Wauwatosa, WI (US); Andrew J. Przybylski, Franksville, WI (US); Matthew J. Ellis, Milwaukee, WI (US); Mohammad N. Elbsat, Milwaukee, WI (US); Michael J. Wenzel, Grafton, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 496 days.

(21) Appl. No.: 18/206,992

(22) Filed: Jun. 7, 2023

(65) Prior Publication Data

US 2023/0312174 A1 Oct. 5, 2023

Related U.S. Application Data

(63) Continuation of application No. 17/491,840, filed on Oct. 1, 2021, now Pat. No. 11,768,003, which is a (Continued)

(51) Int. Cl.
*F24F 11/63* (2018.01)
*B65D 23/08* (2006.01)
(Continued)

(52) U.S. Cl.
CPC .......... *F24F 11/63* (2018.01); *B65D 23/0871* (2013.01); *G05B 19/042* (2013.01);
(Continued)

(58) Field of Classification Search
CPC .... F24F 11/63; F24F 2140/00; F24F 2140/60; F24F 2110/10; F24F 2110/12;
(Continued)

(56) References Cited

U.S. PATENT DOCUMENTS 8,370,280 B1 2/2013 Lin et al.
9,235,657 B1 * 1/2016 Wenzel .............. G05B 13/0265
(Continued)

FOREIGN PATENT DOCUMENTS

CN 101208563 A 6/2008
CN 102043401 A 5/2011
(Continued)

OTHER PUBLICATIONS

CN Office Action with Search Report for CN Appl. Ser. No. 202080049437.8 dated Sep. 20, 2023 (36 pages).
(Continued)

*Primary Examiner* — Alicia M. Choi
(74) *Attorney, Agent, or Firm* — Foley & Lardner LLP

(57) ABSTRACT

A controller for a building control system includes processors and memory storing instructions that, when executed by the processors, cause the processors to perform operations including identifying zones within a building, analyzing data associated with the zones, and generating zone groupings based on the data associated with the zones. Each of the zone groupings define zone groups and specify which of the zones are grouped together to form each of the zone groups. The operations also include identifying a particular zone grouping from zone groupings based on the data associated with zones and using the particular zone grouping to generate control signals to operate equipment of the building control system to provide heating or cooling to the zones.

18 Claims, 7 Drawing Sheets

Related U.S. Application Data continuation-in-part of application No. PCT/US2020/037557, filed on Jun. 12, 2020, and a continuation-in-part of application No. 16/442,103, filed on Jun. 14, 2019, now Pat. No. 11,137,162, said application No. PCT/US2020/037557 is a continuation of application No. 16/442,103, filed on Jun. 14, 2019, now Pat. No. 11,137,162.

(51) Int. Cl.
*G05B 19/042* (2006.01)
*F24F 140/00* (2018.01)
*F24F 140/60* (2018.01)

(52) U.S. Cl.
CPC ....... *F24F 2140/00* (2018.01); *F24F 2140/60* (2018.01); *G05B 2219/2614* (2013.01)

(58) Field of Classification Search
CPC .... F24F 2120/10; F24F 2221/54; F24F 3/065; F24F 3/10; F24F 11/64; F24F 11/65; F24F 11/67; F24F 1/0003; F24F 11/30; F24F 11/006; F24F 11/46; B65D 23/0871; G05B 19/042; G05B 2219/2614; G05B 15/02
See application file for complete search history.

(56) References Cited

U.S. PATENT DOCUMENTS

| | | | | |
|---|---|---|---|---|
| 9,355,069 | B2 | 5/2016 | Elbsat et al. | |
| 9,639,072 | B2 | 5/2017 | Burke | |
| 10,564,612 | B2 | 2/2020 | Patel et al. | |
| 2006/0059926 | A1* | 3/2006 | McCormick | B60H 1/3205 62/129 |
| 2012/0298347 | A1 | 11/2012 | Maeda et al. | |
| 2014/0365017 | A1 | 12/2014 | Hanna et al. | |
| 2015/0045967 | A1* | 2/2015 | Mori | F24F 11/64 700/277 |
| 2015/0178421 | A1 | 6/2015 | Borrelli et al. | |
| 2016/0098022 | A1 | 4/2016 | Wenzel et al. | |
| 2016/0313751 | A1* | 10/2016 | Risbeck | G05B 15/02 |
| 2017/0030598 | A1 | 2/2017 | Burns et al. | |
| 2017/0176036 | A1 | 6/2017 | Macek et al. | |
| 2017/0268729 | A1* | 9/2017 | Jenks | F16K 11/0873 |
| 2018/0004173 | A1 | 1/2018 | Patel et al. | |
| 2018/0004178 | A1* | 1/2018 | Haines | G05B 19/048 |
| 2018/0113482 | A1 | 4/2018 | Vitullo | |
| 2018/0195783 | A1 | 7/2018 | Jung et al. | |
| 2018/0217621 | A1 | 8/2018 | Biesterveld et al. | |
| 2018/0275625 | A1 | 9/2018 | Park et al. | |
| 2018/0320658 | A1 | 11/2018 | Herzog et al. | |
| 2019/0011146 | A1 | 1/2019 | Seo et al. | |
| 2019/0172165 | A1* | 6/2019 | Verteletskyi | G06Q 30/0206 |
| 2019/0257544 | A1 | 8/2019 | Alanqar et al. | |
| 2019/0287147 | A1 | 9/2019 | Ingale et al. | |
| 2019/0316802 | A1 | 10/2019 | Alanqar et al. | |
| 2020/0028703 | A1* | 1/2020 | Homsi | H04L 12/413 |
| 2020/0371482 | A1 | 11/2020 | Alanqar et al. | |
| 2020/0393158 | A1 | 12/2020 | Burroughs et al. | |
| 2021/0018204 | A1 | 1/2021 | Burroughs et al. | |
| 2022/0128252 | A1* | 4/2022 | Reider | F24F 11/32 |
| 2022/0373209 | A1* | 11/2022 | Ko | F24F 11/63 |

FOREIGN PATENT DOCUMENTS

| | | | | |
|---|---|---|---|---|
| CN | 102077031 | A | 5/2011 | |
| CN | 109099552 | A | 12/2018 | |
| EP | 2 857 921 | A1 | 4/2015 | |
| EP | 3370004 | A1 * | 9/2018 | F24F 11/64 |
| WO | WO-2013/145810 | A1 | 10/2013 | |
| WO | WO-2017120262 | A1 * | 7/2017 | G05D 23/1931 |
| WO | WO-2018/005760 | A1 | 1/2018 | |

OTHER PUBLICATIONS

CN Office Action on CN Appl. Ser. No. 202080049437.8 dated Jan. 29, 2023 (10 pages).

International Search Report and Written Opinion on PCT Appl. Ser. No. PCT/US2020/037557, dated Oct. 1, 2020 (14 pages).

JP Office Action on JP Appl. Ser. No. 2021-573781 dated Jun. 20, 2023 (12 pages).

JP Office Action for JP Appl. Ser. No. 2021-573781 dated Dec. 12, 2023 (14 pages).

* cited by examiner

VARIABLE REFRIGERANT FLOW SYSTEM WITH ZONE GROUPING

CROSS-REFERENCE TO RELATED APPLICATIONS

This application is a continuation of U.S. patent application Ser. No. 17/491,840, filed Oct. 1, 2021, which is a continuation-in-part of U.S. patent application Ser. No. 16/442,103 filed Jun. 14, 2019. U.S. patent application Ser. No. 17/491,840 is also a continuation-in-part of International Patent Application No. PCT/US2020/037557 filed Jun. 12, 2020, which claims the benefit of and priority to U.S. patent application Ser. No. 16/442,103 filed Jun. 14, 2019, all of which are incorporated herein by reference in their entirety.

BACKGROUND

The present disclosure relates generally to variable refrigerant flow (VRF) systems. A VRF system typically includes one or more outdoor VRF units that consume electrical power to heat and/or cool a refrigerant. VRF systems also typically include multiple indoor VRF units located in various spaces of a building, each of which receives the refrigerant from the outdoor VRF unit(s) and uses the refrigerant to transfer heat into or out of a particular space.

SUMMARY

One implementation of the present disclosure is a controller for a building control system. The controller includes processors and memory storing instructions that, when executed by the processors, cause the processors to perform operations including identifying zones within a building, analyzing data associated with the zones, and generating zone groupings based on the data associated with the zones. Each of the zone groupings define zone groups and specify which of the zones are grouped together to form each of the zone groups. The operations also include identifying a particular zone grouping from zone groupings based on the data associated with zones and using the particular zone grouping to generate control signals to operate equipment of the building control system to provide heating or cooling to the zones.

In some embodiments, the data associated with the zones includes historical zone temperature set points of the zones and historical energy consumption values of the zones.

In some embodiments, analyzing the data associated with the zones involves grouping each type of data included in the data for each zone over a predetermined time period to generate data blocks for each zone and selecting key features associated with the data blocks.

In some embodiments, the operations further involve generating one zone grouping that is the particular zone grouping defining a plurality of zone groups and specifying which of the plurality of zones are grouped together to form each of the plurality of zone groups.

In some embodiments, analyzing the data associated with the zones involves selecting clustering algorithms to identify clusters of the data associated with the zones and generating the particular zone grouping based on the clusters of the data associated with the zones. In some embodiments, analyzing the data associated with the zones involves preclustering the zones into clusters based on location data of the zones to generate a preclustering of zones, comparing the preclustering of zones with the clusters of the data associated with the zones to determine similarities between the preclustering of zones and the clusters, and generating the particular zone grouping based on the similarities between the preclustering of zones and the clusters.

Another implementation of the present disclosure is a controller for a building control system that operates equipment of the building control system. The controller includes a zone identifier that identifies zones within a building, a zone data collector that collects data associated with the zones within the building, a zone grouping generator module and a control signal generator. The zone grouping generator module generates zone groupings defining zone groups and specifying which of the zones identified by the zone identifier are grouped together to form each of the zone groups, analyzes the data collected by the zone data collector, and identifies a particular zone grouping from the zone groupings based on the data associated with the zones. The control signal generator uses the particular zone grouping determined by the zone grouping generator module to generate control signals to operate equipment of the building control system to provide heating or cooling to the zones.

In some embodiments, the zone data collector collects data associated with the zones within the building including historical zone temperature set points of the zones and energy consumption values of the zones.

In some embodiments, the zone grouping generator module blocks each type of data included in the data for each of the zones over a predetermined time period to generate data blocks for each of the zones and selects key features associated with the data blocks.

In some embodiments, the zone grouping generator module is further configured to generate one zone grouping that is the particular zone grouping defining a plurality of zone groups and specifying which of the plurality of zones are grouped together to form each of the plurality of zone groups.

In some embodiments, the zone grouping generator module selects clustering algorithms to identify clusters of the data associated with the zones and generates the particular zone grouping based on the clusters of the data associated with the zones.

In some embodiments, the zone grouping generator preclusters the zones into clusters based on location data of zones to generate a preclustering of zones, compares the preclustering of zones with the clusters of the data associated with the zones to determine similarities between the preclustering of zones and the clusters, and generates the particular zone grouping based on the similarities between the preclustering of zones and the clusters.

Yet another implementation of the present disclosure is a method for operating equipment of a building control system to provide heating or cooling to zones. The method involves identifying the zones within a building, analyzing data associated with the zones, generating, based on the data associated with the zones, zone groupings that define zone groups and specify which of the zones are grouped together to form each of the zone groups, identifying a particular zone grouping from the zone groupings based on the data associated with the zones, and using the particular zone grouping to generate control signals to operate equipment of the building control system to provide heating or cooling to the zones.

In some embodiments, analyzing the data associated with the zones involves grouping each type of data included in the data for each of the zones over a predetermined time period to generate data blocks for each of zones and selecting key features associated with the data blocks.

In some embodiments, the method further involves generating one zone grouping that is the particular zone grouping defining a plurality of zone groups and specifying which of the plurality of zones are grouped together to form each of the plurality of zone groups.

In some embodiments, analyzing the data associated with the zones involves selecting clustering algorithms to identify clusters of data associated with the zones and generating the particular zone grouping based on the clusters of the data associated with the zones.

In some embodiments, analyzing the data associated with the zones further involves preclustering the zones into clusters based on location data of the zones to generate a preclustering of zones, comparing the preclustering of zones with the clusters of data associated with the zones to determine similarities between the preclustering of zones and the clusters, and generating the particular zone grouping based on the similarities between the preclustering of zones and the clusters.

In some embodiments, a controller for a building control system, includes one or more processors and memory storing instructions that, when executed by the one or more processors, cause the one or more processors to perform operations. The operations include receiving user inputs and piping data for identifying groupings of zones and generating a model for a particular zone group of the groupings of zones using the user inputs and the piping data. The particular zone group comprising a plurality of zones.

In some embodiments, a controller for a building control system includes one or more processors and memory storing instructions that, when executed by the one or more processors, cause the one or more processors to perform operations. The operations include receiving piping data associated with equipment in a plurality of zones, generating one or more zone groupings based at least in part on the piping data associated with the plurality of zones, each of the one or more zone groupings defining a plurality of zone groups and specifying which of the plurality of zones are grouped together to form each of the plurality of zone groups, and using the the particular zone grouping to generate one or more control signals configured to operate equipment of the building control system to provide heating or cooling to the plurality of zones.

Some embodiments relate to a controller for a building control system, the controller comprising one or more processors configured to receive user input data associated an initial configuration of a plurality of zones, generate one or more zone groupings based at least in part on the user input data and equipment data associated with the plurality of zones, each of the one or more zone groupings defining a plurality of zone groups and specifying which of the plurality of zones are grouped together to form each of the plurality of zone groups, and use the particular zone grouping to generate one or more control signals configured to operate equipment of the building control system to provide heating or cooling to the plurality of zones.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a variable refrigerant flow (VRF) system and components thereof are shown, according to some embodiments. The VRF system includes a VRF controller configured to operate equipment included in the VRF system, according to some embodiments. The VRF controller is configured to operate equipment included in the VRF system using control signals to provide heating and/or cooling loads to various spaces included in a structure, according to some embodiments. In order to simplify the control algorithm used by the VRF controller, the various spaces included in the structure are grouped together to form one or more zone groups, according to some embodiments. When generating one or more zone groups, a user may be unaware of the optimal grouping of zones relative to the operation of VRF equipment associated with each zone group.

In order to assist with the generation of one or more zone groups, the VRF controller is configured to identify each zone included in the structure, analyze data associated with each zone, generate zone groupings based on the analyzed data, and output one or more zone groupings for use in VRF control, according to some embodiments. Advantageously, the VRF controller assists a user with the commissioning of a VRF system by reducing the number of zone grouping iterations performed by the user.

Variable Refrigerant Flow Systems

Figure 1A:
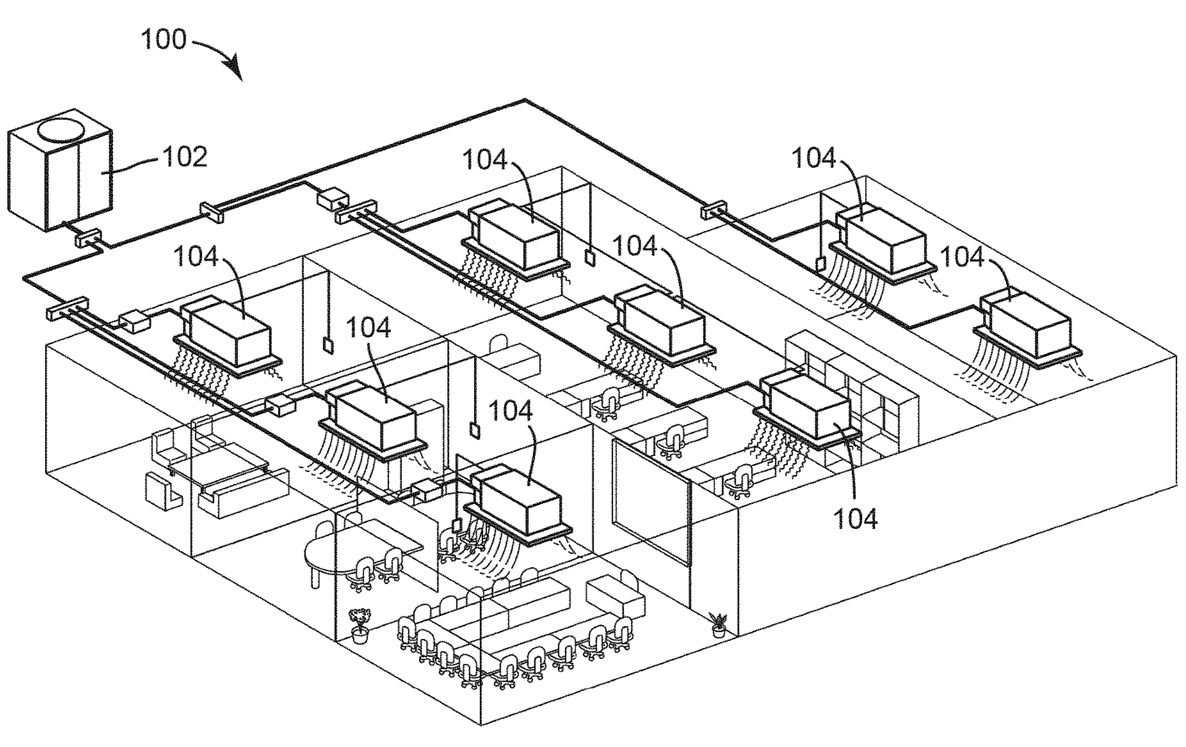
FIG. 1A is a first illustration of a variable refrigerant flow system for a building, according to an exemplary embodiment.
Figure 1B:
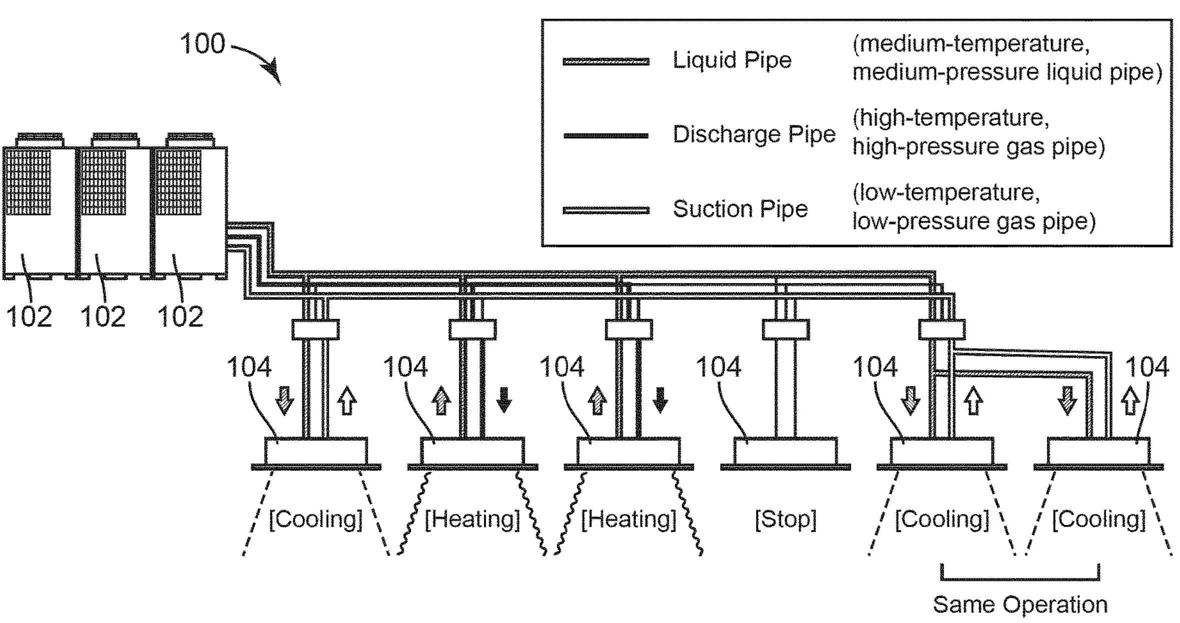
FIG. 1B is a second illustration of a variable refrigerant flow system for a building, according to an exemplary embodiment.

Referring now to FIGS. 1A-B, a variable refrigerant flow (VRF) system 100 is shown, according to some embodiments. VRF system 100 is shown to include one or more outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit 104 is located. Although the term "indoor" is used to denote that the indoor VRF units 104 are typically located inside of buildings, in some cases one or more indoor VRF units are located "outdoors" (i.e., outside of a building) for example to heat/cool a patio, entryway, walkway, etc.

One advantage of VRF system 100 is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 100.

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of outdoor VRF units 102 may operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system is described in detail with reference to FIG. 2.

Figure 2:
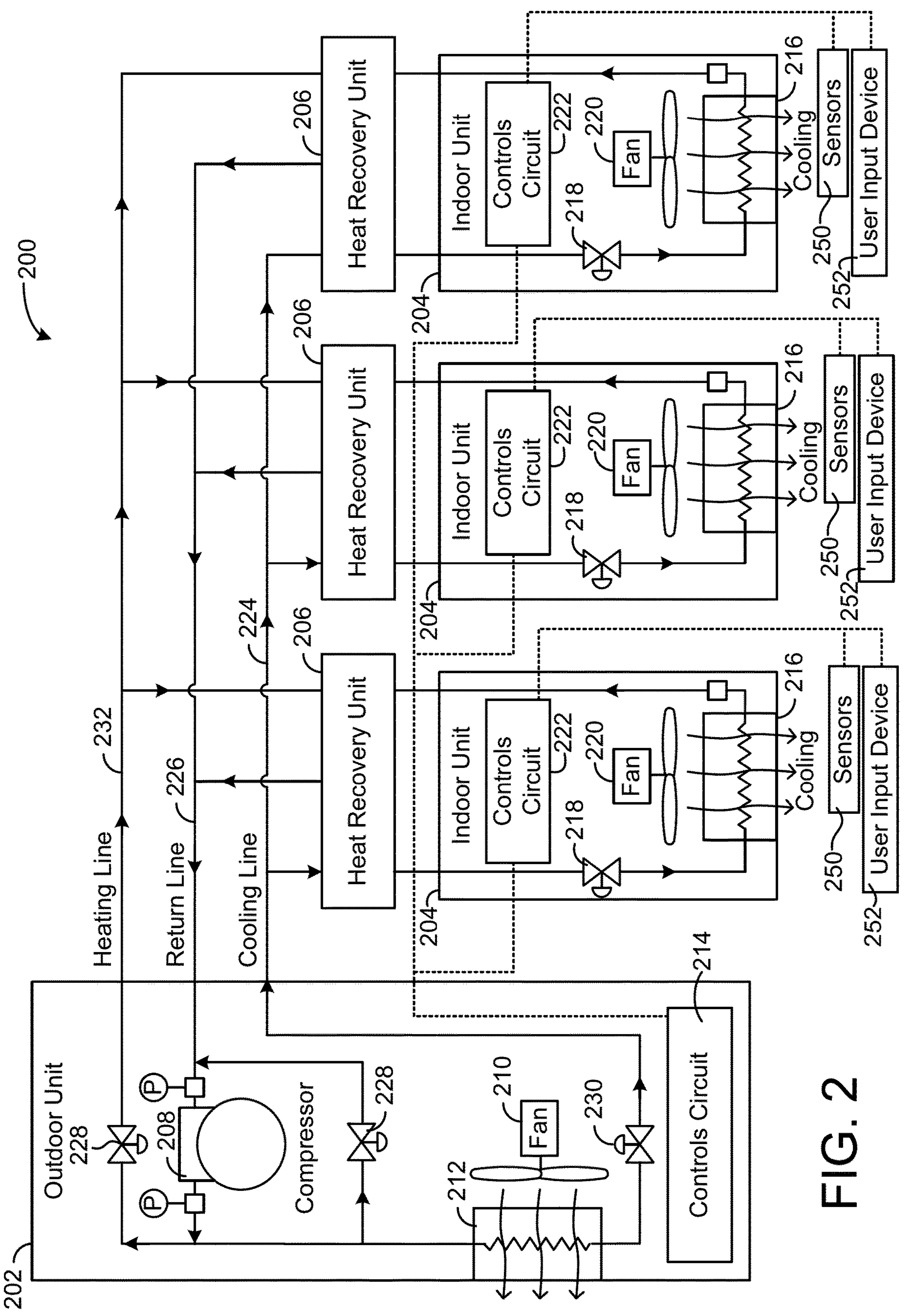
FIG. 2 is a detailed diagram of a variable refrigerant flow system for a building, according to an exemplary embodiment.

Referring now to FIG. 2, a block diagram illustrating a VRF system 200 is shown, according to an exemplary embodiment. VRF system 200 is shown to include outdoor VRF unit 202, several heat recovery units 206, and several indoor VRF units 204. Although FIG. 2 shows one outdoor VRF unit 202, embodiments including multiple outdoor VRF units 202 are also within the scope of the present disclosure. Outdoor VRF unit 202 may include a compressor 208, a fan 210, or other power-consuming refrigeration components configured convert a refrigerant between liquid, gas, and/or super-heated gas phases. Indoor VRF units 204 can be distributed throughout various building zones within a building and can receive the heated or cooled refrigerant from outdoor VRF unit 202. Each indoor VRF unit 204 can provide temperature control for the particular building zone in which the indoor VRF unit 204 is located. Heat recovery units 206 can control the flow of a refrigerant between outdoor VRF unit 202 and indoor VRF units 204 (e.g., by opening or closing valves) and can minimize the heating or cooling load to be served by outdoor VRF unit 202.

Outdoor VRF unit 202 is shown to include a compressor 208 and a heat exchanger 212. Compressor 208 circulates a refrigerant between heat exchanger 212 and indoor VRF units 204. The compressor 208 operates at a variable frequency as controlled by VRF Controller 214. At higher frequencies, the compressor 208 provides the indoor VRF units 204 with greater heat transfer capacity. Electrical power consumption of compressor 208 increases proportionally with compressor frequency.

Heat exchanger 212 can function as a condenser (allowing the refrigerant to reject heat to the outside air) when VRF system 200 operates in a cooling mode or as an evaporator (allowing the refrigerant to absorb heat from the outside air) when VRF system 200 operates in a heating mode. Fan 210 provides airflow through heat exchanger 212. The speed of fan 210 can be adjusted (e.g., by VRF Controller 214) to modulate the rate of heat transfer into or out of the refrigerant in heat exchanger 212.

Each indoor VRF unit 204 is shown to include a heat exchanger 216 and an expansion valve 218. Each of heat exchangers 216 can function as a condenser (allowing the refrigerant to reject heat to the air within the room or zone) when the indoor VRF unit 204 operates in a heating mode or as an evaporator (allowing the refrigerant to absorb heat from the air within the room or zone) when the indoor VRF unit 204 operates in a cooling mode. Fans 220 provide airflow through heat exchangers 216. The speeds of fans 220 can be adjusted (e.g., by indoor unit controls circuits 222) to modulate the rate of heat transfer into or out of the refrigerant in heat exchangers 216.

In FIG. 2, indoor VRF units 204 are shown operating in the cooling mode. In the cooling mode, the refrigerant is provided to indoor VRF units 204 via cooling line 224. The refrigerant is expanded by expansion valves 218 to a cold, low pressure state and flows through heat exchangers 216 (functioning as evaporators) to absorb heat from the room or zone within the building. The heated refrigerant then flows back to outdoor VRF unit 202 via return line 226 and is compressed by compressor 208 to a hot, high pressure state. The compressed refrigerant flows through heat exchanger 212 (functioning as a condenser) and rejects heat to the outside air. The cooled refrigerant can then be provided back to indoor VRF units 204 via cooling line 224. In the cooling mode, flow control valves 228 can be closed and expansion valve 230 can be completely open.

In the heating mode, the refrigerant is provided to indoor VRF units 204 in a hot state via heating line 232. The hot refrigerant flows through heat exchangers 216 (functioning as condensers) and rejects heat to the air within the room or zone of the building. The refrigerant then flows back to outdoor VRF unit via cooling line 224 (opposite the flow direction shown in FIG. 2). The refrigerant can be expanded by expansion valve 230 to a colder, lower pressure state. The expanded refrigerant flows through heat exchanger 212 (functioning as an evaporator) and absorbs heat from the outside air. The heated refrigerant can be compressed by compressor 208 and provided back to indoor VRF units 204 via heating line 232 in a hot, compressed state. In the heating mode, flow control valves 228 can be completely open to allow the refrigerant from compressor 208 to flow into heating line 232.

As shown in FIG. 2, each indoor VRF unit 204 includes an indoor unit controls circuit 222. Indoor unit controls circuit 222 controls the operation of components of the indoor VRF unit 204, including the fan 220 and the expansion valve 218, in response to a building zone temperature setpoint or other request to provide heating/cooling to the building zone. The indoor unit controls circuit 222 may also determine a heat transfer capacity required by the indoor VRF unit 204 and transmit a request to the outdoor VRF unit 202 requesting that the outdoor VRF unit 202 operate at a corresponding capacity to provide heated/cooled refrigerant to the indoor VRF unit 204 to allow the indoor VRF unit 204 to provide a desired level of heating/cooling to the building zone.

Each indoor unit controls circuit 222 is shown as communicably coupled to one or more sensors 250 and a user input device 252. In some embodiments, the one or more sensors 250 may include a temperature sensor (e.g., measuring indoor air temperature), a humidity sensor, and/or a sensor measuring some other environmental condition of a building zone served by the indoor VRF unit 204. In some embodiments, the one or more sensors include an occupancy detector configured to detect the presence of one or more people in the building zone and provide an indication of the occupancy of the building zone to the indoor unit controls circuit 222.

Each user input device 252 may be located in the building zone served by a corresponding indoor unit 204. The user input device 252 allows a user to input a request to the VRF system 200 for heating or cooling for the building zone and/or a request for the VRF system 200 to stop heating/cooling the building zone. According to various embodiments, the user input device 252 may include a switch, button, set of buttons, thermostat, touchscreen display, etc. The user input device 252 thereby allows a user to control the VRF system 200 to receive heating/cooling when desired by the user.

The indoor unit controls circuit 222 may thereby receive an indication of the occupancy of a building zone (e.g., from an occupancy detector of sensors 250 and/or an input of a user via user input device 252). In response, the indoor unit controls circuit 222 may generate a new request for the outdoor VRF unit 202 to operate at a requested operating capacity to provide refrigerant to the indoor unit 204. The indoor unit controls circuit 222 may also receive an indication that the building zone is unoccupied and, in response, generate a signal instructing the outdoor VRF unit 202 to stop operating at the requested capacity. The indoor unit controls circuit 222 may also control various components of the indoor unit 204, for example by generating a signal to turn the fan 220 on and off.

The outdoor unit controls circuit 214 may receive heating/cooling capacity requests from one or more indoor unit controls circuits 222 and aggregate the requests to determine a total requested operating capacity. Accordingly, the total requested operating capacity may be influenced by the occupancy of each of the various building zones served by various indoor units 204. In many cases, a when a person or people first enter a building zone and a heating/cooling request for that zone is triggered, the total requested operating capacity may increase significantly, for example reaching a maximum operating capacity. Thus, the total request operating capacity may vary irregularly and unpredictably as a result of the sporadic occupation of various building zones.

The outdoor unit controls circuit 214 is configured to control the compressor 208 and various other elements of the outdoor unit 202 to operate at an operating capacity based at least in part on the total requested operating capacity. At higher operating capacities, the outdoor unit 202 consumes more power, which increases utility costs. In some embodiments, the VRF controller may be capable of For an operator, owner, lessee, etc. of a VRF system, it may be desirable to minimize power consumption and utility costs to save money, improve environmental sustainability, reduce wear-and-tear on equipment, etc. In some cases, multiple entities or people benefit from reduced utility costs, for example according to various cost apportionment schemes for VRF systems described in U.S. patent application Ser. No. 15/920,077 filed Mar. 13, 2018, incorporated by reference herein in its entirety. Thus, as described in detail below, the controls circuit 214 may be configured to manage the operating capacity of the outdoor VRF unit 202 to reduce utility costs while also providing comfort to building occupants. Accordingly, in some embodiments, the controls circuit 214 may be operable in concert with systems and methods described in P.C.T. Patent Application No. PCT/US2017/039937 filed Jun. 29, 2017, and/or U.S. patent application Ser. No. 15/635,754 filed Jun. 28, 2017, both of which are incorporated by reference herein in their entireties.

VRF System with Zone Grouping Method

Referring generally to FIGS. 3-8, systems and methods for generating zone groupings and using the zone groupings to control equipment in a building control system are shown, according to some embodiments. The systems and methods of FIGS. 3-8 can be implemented using or as part of a building management system or HVAC system, for example, VRF system 100 of FIG. 1A, according to some embodiments. For ease and clarity of explanation, the following description of FIGS. 3-8 make reference to elements of VRF system 100. However, it should be noted that various embodiments of the present disclosure may be implemented in a variety of HVAC systems, BMS, and combinations thereof and are not limited to VRF systems.

Figures 3, 4:
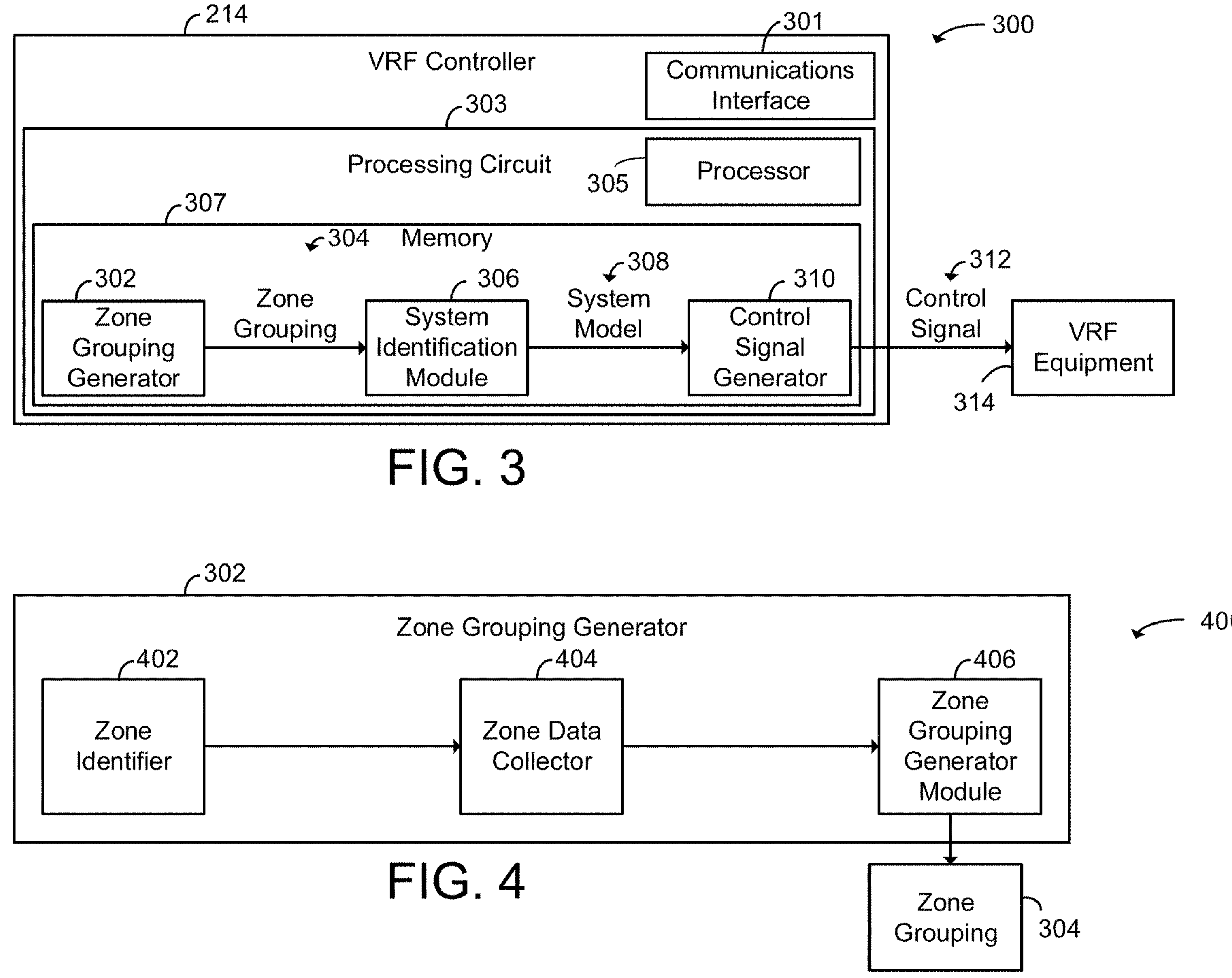
FIG. 3 is a block diagram of a VRF controller implemented with the variable refrigerant flow system of FIG. 2, according to an exemplary embodiment.
FIG. 4 is a block diagram of a zone grouping generator implemented with the VRF controller of FIG. 3, according to an exemplary embodiment.

Referring now to FIG. 3, a detailed block diagram 300 of VRF controller 214 is shown, according to some embodiments. VRF controller 214 is shown to include a communications interface 301 and a processing circuit 303 having a processor 305 and memory 307, according to some embodiments. In some embodiments, communications interface 301 facilitates communications between VRF controller 214 and devices included in VRF system 200 (e.g., compressor 208, indoor units 204, etc.) for allowing user control, monitoring, and adjustment to devices included in VRF system 100.

Communications interface 301 can be or include wired or wireless communications interfaces (e.g., jacks, antennas, transmitters, receivers, transceivers, wire terminals, etc.) for conducting data communications with devices included in VRF system 200 or other external systems or devices, according to some embodiments. In some embodiments, communications via communications interface 301 can be direct (e.g., local wired or wireless communications) or via a communications network (e.g., a WAN, the Internet, a cellular network, etc.). For example, communications interface 301 can include an Ethernet card and port for sending and receiving data via an Ethernet-based communications link or network. In another example, communications interface 301 can include a Wi-Fi transceiver for communicating via a wireless communications network. In yet another example, communications interface 301 can include cellular or mobile phone communications transceivers.

Still referring to FIG. 3, processing circuit 303 can be communicably connected to communications interface 301 such that processing circuit 303 and the various components thereof can send and receive data via communications interface 301, according to some embodiments. Processor 305 can be implemented as a general purpose processor, an application specific integrated circuit (ASIC), one or more field programmable gate arrays (FPGAs), a group of processing components, or other suitable electronic processing components, according to some embodiments.

Memory 307 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application, according to some embodiments. In some embodiments, memory 307 can be or include volatile memory or non-volatile memory. Memory 307 can include database components, object code components, script components, or any other type of information structure for supporting the various activities and information structures described in the present application, according to some embodiments. According to some embodiments, memory 307 is communicably connected to processor 305 via processing circuit 303 and includes computer code for executing (e.g., by processing circuit 303 and/or processor 305) one or more processes described herein.

Still referring to FIG. 3, memory 307 is shown to include a zone grouping generator 302, a system identification module 306, and a control signal generator 310, according to some embodiments. In some embodiments, zone grouping generator 302 is configured to collect zone data, analyze zone data to generate zone groupings based on the analyzed zone data, and provide an output of a zone grouping 304. Zone grouping 304 indicates a way in which a plurality of building zones can be grouped for purposes of system identification and building control, according to some embodiments. In some embodiments, all of the building zones within a single zone group are treated as a single unit when generating a system model and control signals. For example, a different system model may be generated for each zone group (using data from all of the zones in that zone group) and the system model for a zone group may be used to generate control signals for all of the zones in that zone group. The functionality and methods of zone grouping generator 302 will be described in greater detail below. Zone grouping generator 302 can be configured to output zone grouping 304 to system identification module 306, according to some embodiments. In some embodiments, zone grouping 304 includes one or more zone groupings. In other embodiments, zone grouping 304 includes individual zones identified as a best zone grouping.

As shown in FIG. 3, zone grouping 304 is transmitted as an input to system identification module 306, according to some embodiments. System identification module 306 is configured to perform a system identification process to generate a model of the system, according to some embodiments. Possible system identification processes which can be performed by system identification module 306 are described in U.S. Pat. No. 9,235,657 granted Jan. 12, 2016, incorporated by reference herein its entirety. In general, system identification is a process of identifying unspecified system parameters in a model of the building, for example by minimizing prediction errors. In some embodiments, system identification module 306 can be configured to perform a system identification process for each of the zone groups in zone grouping 304 generated by zone grouping generator 302.

Each system identification process generates a system model 308 for a particular zone group using the input data and output data associated with all of the building zones in that zone group, according to some embodiments. For example, system identification module 306 may use zone grouping 304 to identify all of the building zones within a first zone group of zone grouping 304 in order to generate a system model associated with the first zone group. In some embodiments, system identification module 306 obtains training data (e.g., input data and output data) associated with the building zones in the first group and uses the training data to train a system model for the first zone group. System identification module 306 repeats this process for each of the zone groups in zone grouping 304 to generate a different system model for each zone group in zone grouping 304, according to some embodiments. According to some embodiments, system identification module 306 provides each system model 308 to control signal generator 310.

Control signal generator 310 is shown to receive system model 308 from system identification module 306, according to some embodiment. In some embodiments, control signal generator 310 uses system models 308 to generate appropriate control signals for VRF equipment 314 that operate to control an environment of one or more zone groups. Each system model 308 may correspond to a particular zone group defined by zone grouping 304 generated by zone grouping generator 302 and may be used to generate control signals for the corresponding zone group. In some embodiments, control signal generator 310 uses any of a variety of model-based control methodologies (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to generate a control signal 312. Control signal generator 310 is shown to output control signal 312 to VRF equipment 314, according to some embodiments. In some embodiments, control signal 312 includes commands to operate VRF equipment 314.

Zone Grouping Generator

Referring now to FIG. 4, a block diagram 400 illustrating zone grouping generator 302 in greater detail is shown, according to some embodiments. Zone grouping generator 302 is shown to include a zone identifier 402, a zone data collector 404, and a zone grouping generator module 406 to determine zone grouping 304 as an output, according to some embodiments.

As shown in FIG. 4, zone identifier 402 is configured to identify the types of zones in a building, according to some embodiments. For example, zone identifier 402 may be tasked with identifying the types and/or number of zones in a building that functions as a school. The types of zones in a school may include classrooms, laboratories, restrooms, and hallways. Additional types of zones may be identified and are not limited to the types of zones previously listed.

As shown in FIG. 4, zone data collector 404 is configured to collect zone data of the zones identified by zone identifier 402, according to some embodiments. In some embodiments, the collected zone data includes historical values (e.g., temperature setpoints, indoor air temperature, etc.) In some embodiments, the collected zone data includes zone characteristics (e.g., operating modes of zones, relative locations of each zone in a zone group, etc.) In some embodiments, the data collected includes additional data types or any combination of data types.

In some embodiments, zone data collector 404 is configured to continuously collect zone data and monitor changes in the collected zone data over a predetermined period of time. For example, zone data collector 404 may continuously collect values of the temperature setpoints associated with the zones identified by zone identifier 402 and monitor changes in the temperature setpoints associated with each zone over a period of a week. In some such embodiments, zone data collector 404 is configured to determine a need to generate a new zone grouping based on changes in zone data and automatically trigger a new zone grouping process to zone grouping generator 302. For example, zone data collector 404 may detect a change in a temperature of a zone outside an acceptable threshold range over a period of a week and automatically transmit a signal to zone grouping generator 302 to generate a new zone grouping. In some embodiments, the acceptable threshold range of values are inputted by a user. For example, a user may input the acceptable threshold range of values for a temperature setpoint associated a particular zone may be ±2° F. of the temperature setpoint.

Zone grouping generator module 406 is shown to be included in zone grouping generator 302, according to some embodiments. In some embodiments, zone grouping generator module 406 can be configured to generate a plurality of different zone groupings. Each zone grouping defines one or more zone groups and specifies one or more building zones within each zone group, according to some embodiments. Accordingly, each zone grouping defines a different way in which a plurality of building zones can be organized into zone groups. Examples of two different zone groupings that can be generated for the same set of building zones are described in greater detail with reference to FIGS. 5A and 5B. In some embodiments, zone grouping generator module 406 combines zones into groups of two or more to form a zone group. In some embodiments, zone grouping generator module 406 generates a single zone as a group. As will be described in greater detail below, zone grouping generator module 406 is configured to perform cluster analysis of the zone data collected by zone data collector 404 associated with the one or more zones identified by zone identifier 402 in order to generate one or more different zone groupings, according to some embodiments.

Figure 5A:
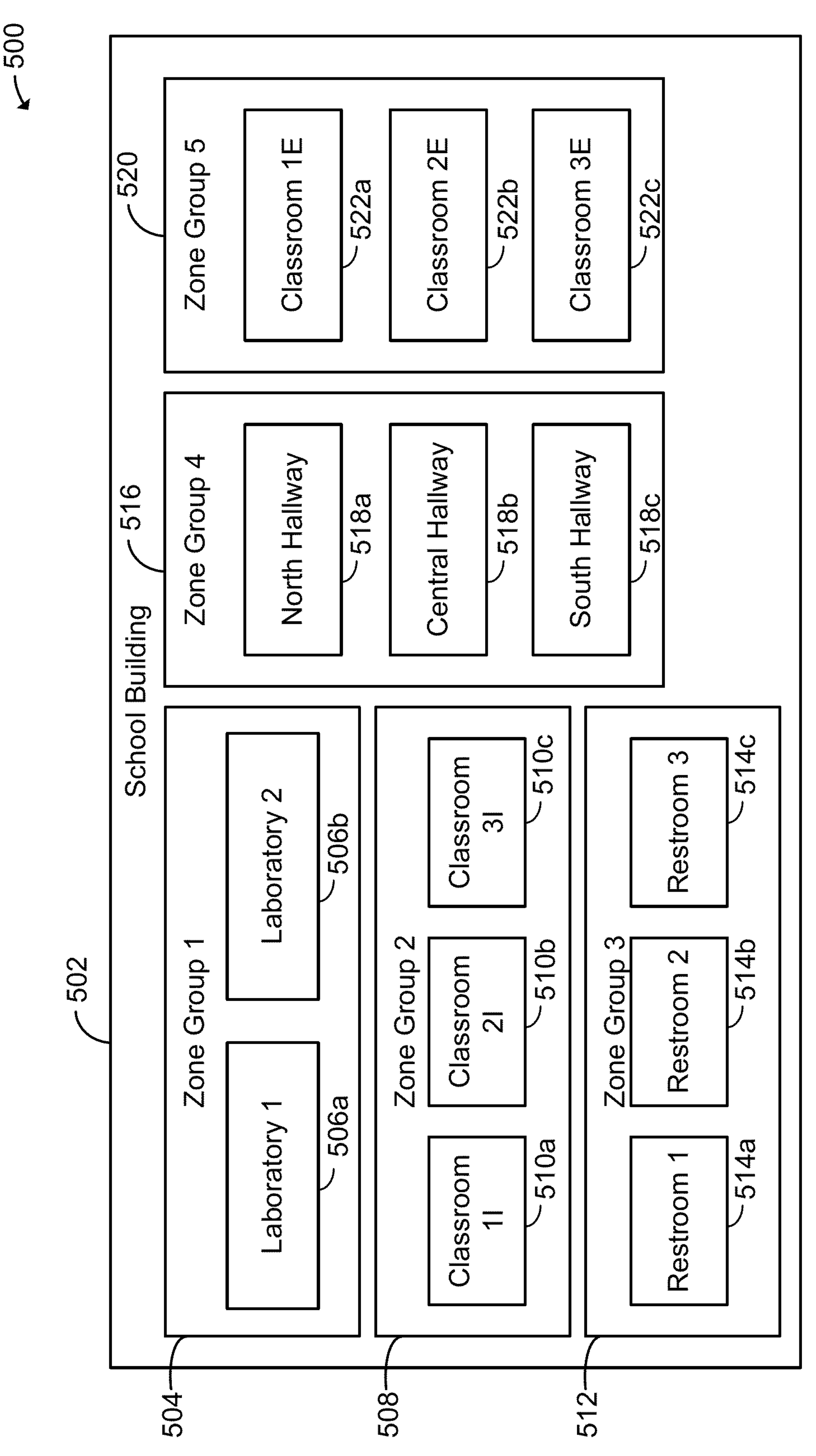
FIG. 5A is a first example of a zone grouping generated by the zone grouping generator of FIG. 4, according to an exemplary embodiment.
Figure 5B:
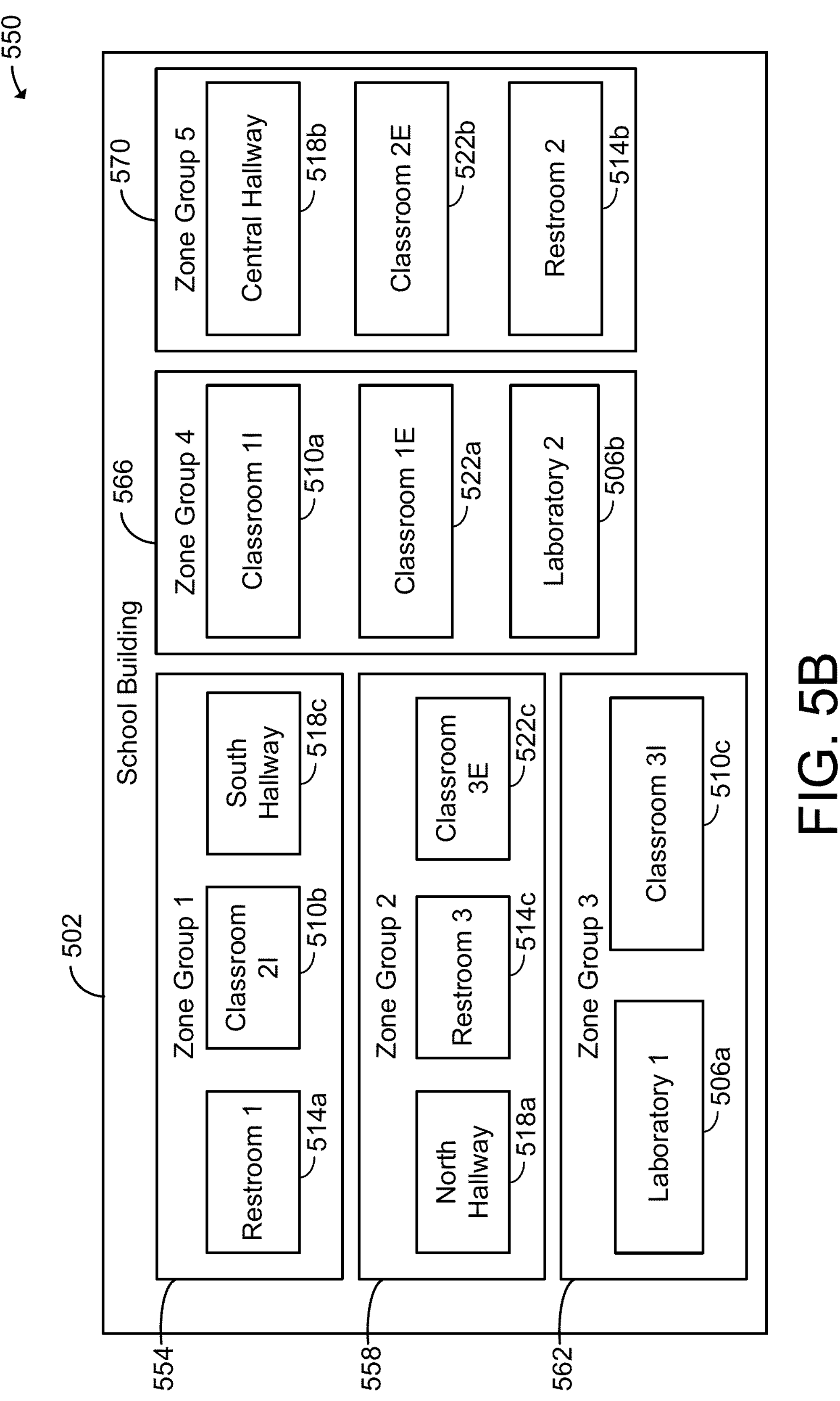
FIG. 5B is a second example of a zone grouping generated by the zone grouping generator of FIG. 4, according to an exemplary embodiment.

Referring now to FIG. 5A and FIG. 5B, examples of various zone groupings are shown, according to some embodiments. FIGS. 5A and 5B are shown to include a structure 502 functioning as a school, according to some embodiments. In some embodiments, structure 502 is shown to include laboratories 506*a* and 506*b* (referred to collectively as laboratories 506), interior classrooms 510*a*, 510*b*, and 510*c* (referred to collective as interior classrooms 510), restrooms 514*a*, 514*b*, and 514*c* (referred to collectively as restrooms 514), hallways 518*a*, 518*b*, and 518*c* (referred to collectively as hallways 518), and exterior classrooms 522*a*, 522*b*, and 522*c* (referred to collectively as exterior classrooms 522). In some embodiments, the zones in structure 502 were grouped using zone grouping generator 302. Each of the individual zones in structure 502 were identified using zone identifier 402, according to some embodiments. In some embodiments, zone grouping generator module 406 generated multiple zone groupings. In some embodiments, only two different (e.g., combinations of zone groups) zone groupings were generated by zone grouping generator module 406. In some embodiments, more than two different zone groupings are generated by zone grouping generator module 406.

Referring to specifically to FIG. 5A, a first zone grouping 500 is shown to include a zone group one 504 including laboratories 506, a zone group two 508 including classrooms 510, a zone grouping three 512 including restrooms 514, a zone group four 516 including hallways 518, and a zone group five 520 including classrooms 522, according to some embodiments.

Referring specifically to FIG. 5B, a second zone grouping 550 is shown, according to some embodiments. Second zone grouping 550 is shown to include a zone group one 554 including restroom 514*a*. classroom 510*b*, and south hallway 518*c*, a zone group two 558 including north hallway 518*a*, restroom 514*c*, and classroom 522*c*, a zone grouping three 562 including laboratory 506*a* and classroom 510*c*, a zone group four 566 including classroom 510*a*, classroom 522*a*, and laboratory 506*b*, and a zone group five 570 including central hallway 518*b*, classroom 522*b*, and restroom 514*b*, according to some embodiments.

Prior to the generation of first zone grouping 500 and second zone grouping 550, each zone in structure 502 was identified by zone identifier 402, according to some embodiments. Following the identification of each zone in structure 502, zone data is collected for each zone in structure 502 by zone data collector 404, according to some embodiments. Zone grouping generator module 406 used the zone data collected by zone data collector 404 to perform one of more clustering algorithms, according to some embodiments. The clustering algorithms performed by zone grouping generator module 406 generated first zone grouping 500 and second zone grouping 550 for use in VRF control. In some embodiments where two or more zone groupings are generated, a user selects which zone grouping is to be used in VRF control.

Method of VRF Control with Zone Grouping Generation

Figure 6:
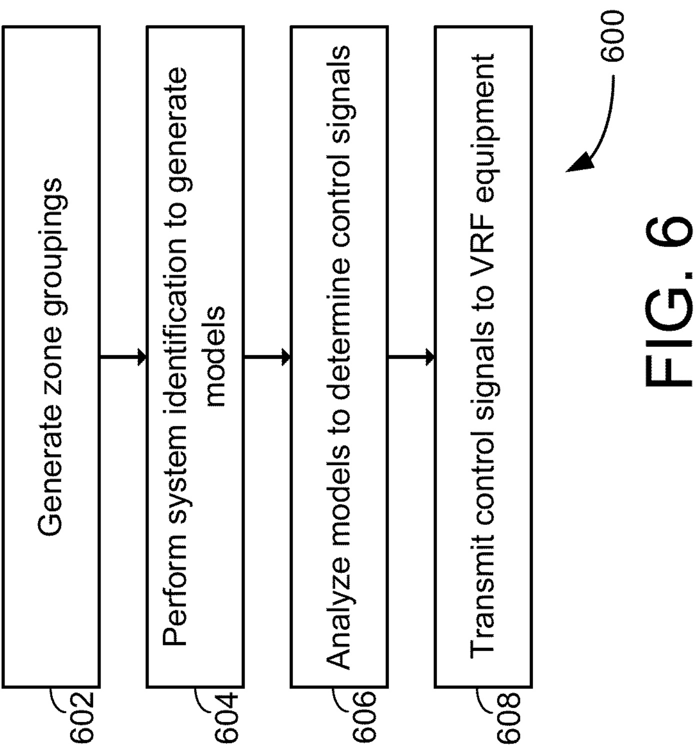
FIG. 6 is flowchart of the general VRF control process including zone grouping generation, according to an exemplary embodiment.

Referring to FIG. 6, a process 600 for generating system models and using the system models to control a variable refrigerant flow system is shown, according to some embodiments. Process 600 begins with step 602, according to some embodiments. Step 602 involves generating zone groupings using zone grouping generator 302, according to some embodiments. At step 602, zone grouping generator 302 is configured to generate one or more zone groupings and provide an output of a zone grouping to system identification module 306, according to some embodiments. In some embodiments, all of the building zones within a single zone group are treated as a single unit when generating a system model and control signals. For example, a different system model may be generated for each zone group (using data from all of the zones in that zone group) and the system model for a zone group may be used to generate control signals for all of the zones in that zone group. The method of generating zone groupings will be described in greater below.

Process 600 continues with step 604, according to some embodiments. Step 604 involves performing system identification to generate models of the zone grouping generated in step 602 using system identification module 306, according to some embodiments. At step 604, system identification module 306 is configured to perform a system identification process to generate a model of the system, according to some embodiments. In some embodiments, system identification module 306 obtains training data (e.g., input data and output data) associated with the building zones in the first group and uses the training data to train a system model for the first zone group. In some embodiments, system identification module 306 repeats this process for each of the zone groups in a zone grouping to generate a different system model for each zone group. In some embodiments, system identification module 306 is configured to perform a system identification process for each of the zone groups in the zone grouping generated by zone grouping generator 302 in step 602.

Process 600 continues with step 606, according to some embodiments. In some embodiments, step 606 includes using the models generated in 604 to generate control signals for VRF equipment using control signal generator 310. At step 606, control signal generator 310 is configured to receive one or more system models generated by system identification module 306 in step 604, according to some embodiments. In some embodiments, control signal generator 310 uses system models generated by system identification module 306 in step 604 to generate appropriate control signals for VRF equipment 314 that operate to control an environment of one or more zone groups. In some embodiments, control signal generator 310 uses any of a variety of model-based control methodologies (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to generate a control signal in step 606.

Process 600 is shown to continue with step 608, according to some embodiments. Step 608 includes transmitting the control signals generated by control signal generator 310 in step 606 to various VRF equipment, according to some embodiments. In some embodiments, the generated control signals are transmitted to various indoor VRF units located within a particular zone or zone group configured to control one or more environmental variables (e.g., temperature, humidity, etc.) of one or more zones in a particular zone group. In some embodiments, the generated control signals are transmitted to various outdoor VRF units configured to provide refrigerant to various indoor VRF units located within a particular zone or zone group.

Method of Zone Grouping Generation

Figure 7:
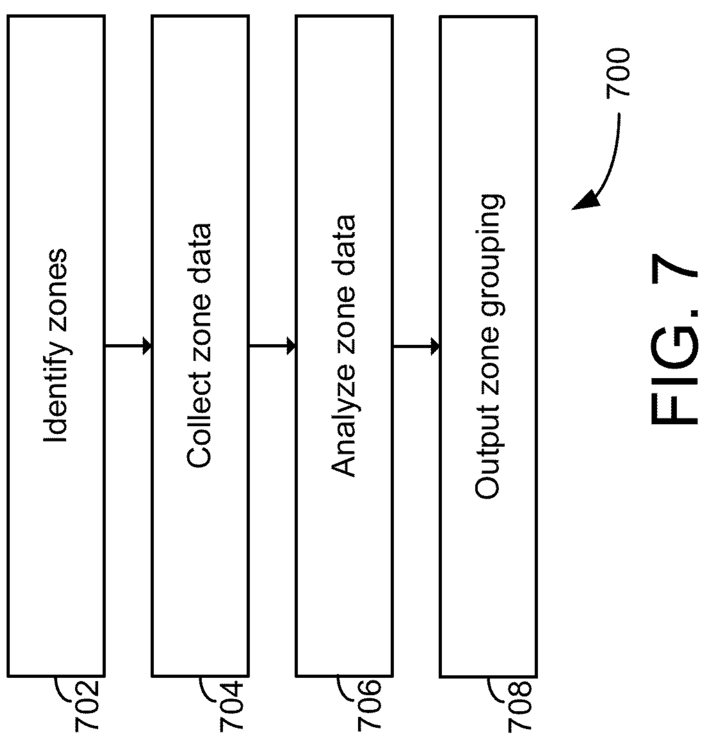
FIG. 7 is a flowchart of the zone grouping generation process implemented in the VRF control process of FIG. 6, according to an exemplary embodiment.

Referring now to FIG. 7, a process 700 for generating zone groupings is shown, according to some embodiments. Process 700 begins with step 702, according to some embodiments. At step 702, zone identifier 402 is configured to identify the types and/or number of zones in a structure, according to some embodiments. For example, step 702 may involve zone identifier 402 identifying the types and number of zones in a structure that functions as a school. In some embodiments, the types of zones in a school includes classrooms, laboratories, restrooms, and hallways. Additional types of zones may be identified and are not limited to the types of zones previously listed.

Still referring to FIG. 7, process 700 is shown to continue with step 704, according to some embodiments. In some embodiments, step 704 includes zone data collector 404 collecting zone data of the zones identified by zone identifier 402 in step 702. In some embodiments, the collected data includes historical values (e.g., temperature setpoints of zones, energy consumption by zones, etc.) In some embodiments, the collected data includes zone characteristics (e.g., relative locations of each zone in a zone group, etc.) In some embodiments, the data collected includes additional data types or any combination of data types.

In some embodiments, step 704 involves zone data collector 404 continuously collecting data and monitoring changes in the collected data over a predetermined period of time. In some such embodiments, step 704 involves zone data collector 404 determining a need to generate a new zone grouping based on changes in zone data and automatically triggering a new zone grouping process to zone grouping generator 302. For example, if zone data collector 404 receives indoor air temperature data containing values outside a predetermined acceptable threshold range of indoor air temperature values for a particular zone in a zone group, then zone data collector 404 may transmit a signal to zone grouping generator 302 to run a new zone grouping process.

Process 700 is shown in continue with step 706, according to some embodiments. As will be described in greater detail below with reference to FIGS. 8, in some embodiments, step 706 involves zone grouping generator module 406 using zone data collected by zone data collector 404 in step 704 in one or more clustering algorithms in order to determine an optimal zone grouping based on the collected zone data. Further, in some embodiments, step 706 involves analyzing location data for each zone in a structure. In some such embodiments, analyzing location data for each zone in a structure further involves a preclustering process configured to cluster each zone into a zone group based on the location data. For example, a floorplan of a building including the zones for use in process 700 may be converted to grid coordinates to determine numeric location values based on the grid coordinates. Each numeric location value is used in one or more clustering algorithms to generate zone groupings based on the relative location of each zone, according to some embodiments. In some embodiments, step 708 involves zone grouping generator module 406 outputting a zone grouping based on the analyzed data of step 706 to system identification module 306 in order to generate system models associated with the zone grouping.

Figure 8:
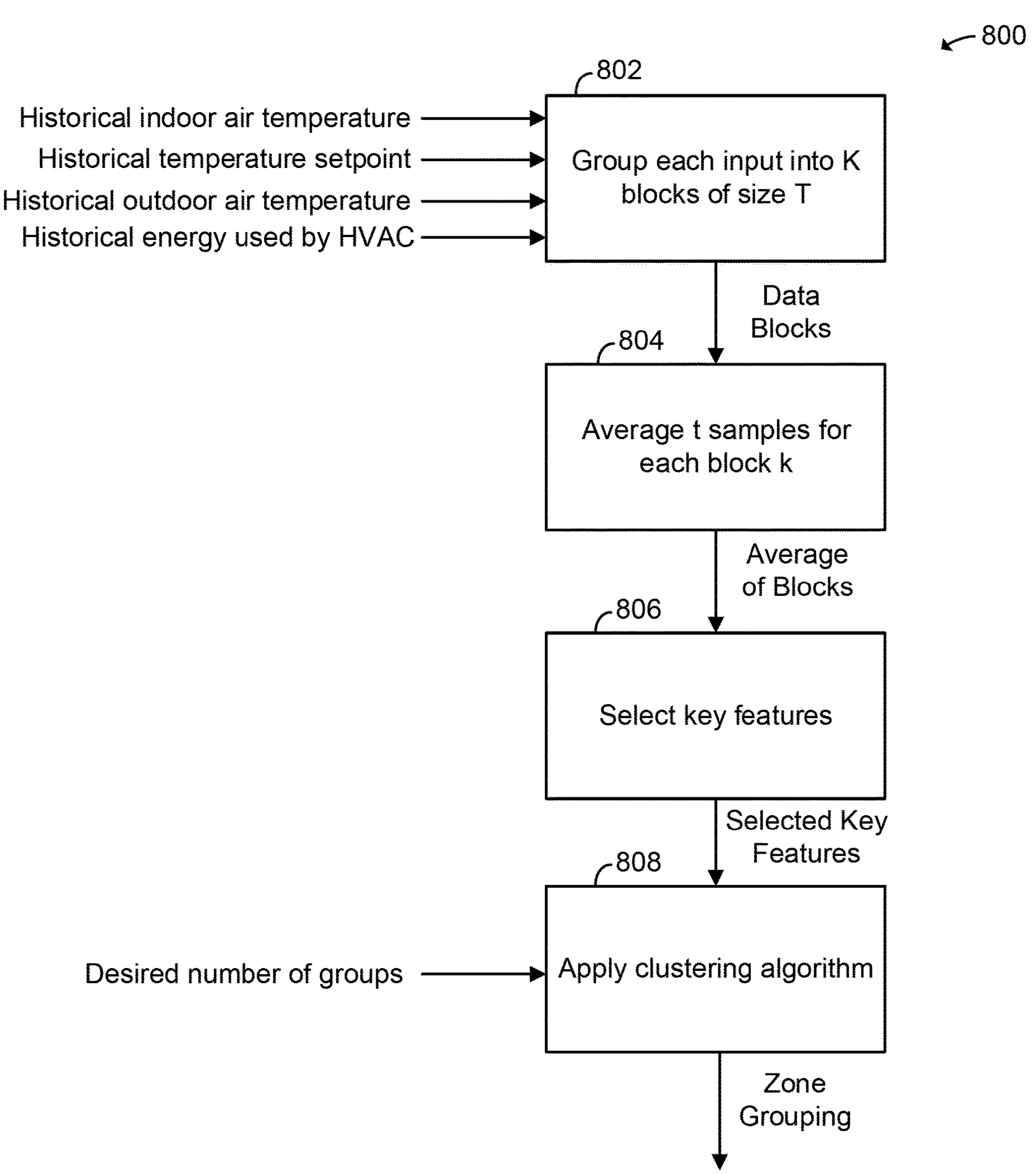
FIG. 8 is a flowchart illustrating the data analysis process implemented in the zone grouping generation process of FIG. 7, according to an exemplary embodiment.

Referring now to FIG. 8, a process 800 for analyzing zone data and determining zone groupings is shown, according to some embodiments. Process 800 can be performed to accomplish step 706 of process 700. In some embodiments, process 800 is configured to use raw data (e.g., historic temperature setpoints, historic indoor air temperature, etc.) collected over a period of time (e.g., days, weeks, months, etc.). In some embodiments, the raw data used in process 800 is zone data collected by zone data collector 404 in step 704 of process 700. In some embodiments, process 800 involves zone grouping generator module 406 analyzing zone data and generating zone groupings.

The different types of raw data provided as an input to process 800 are shown to include historical indoor air temperature, historical temperature setpoints, historical outdoor air temperature, and historical energy used by HVAC. Some of the types of input data may be specific to particular zones whereas other types of input data may apply to the building or campus as a whole. For example, historical indoor air temperature, historical temperature setpoint, and historical energy used by HVAC may be zone-specific, whereas historical outdoor air temperature may apply to the building or campus as a whole. For any zone-specific data types, the input data to process 800 may include a separate data set for each zone. For example, the input data may include a set of historical temperature setpoints for zone A, a set of historical temperature setpoints for zone B, etc. The same is true of historical indoor air temperature and historical energy used by HVAC.

Each set of input data to process 800 may include a timeseries of values. Each timeseries of values may include multiple samples of a particular point or variable (e.g., zone A indoor air temperature, zone B indoor air temperature, zone A temperature setpoint, zone B temperature setpoint, outdoor air temperature, etc.). Each sample may include both a data value (e.g., 75 degrees F.) indicating a value of the sample and a timestamp (e.g., 2018-07-05-18:00:00) indicating a time at which the sample was measured or generated. Accordingly, the input data to process 800 may include a set of timeseries, each timeseries corresponding to a particular point or variable. Some of the timeseries (and corresponding points or variables) may be specific to a particular zone, whereas other timeseries may apply to the building or campus as a whole.

In some embodiments, the input data to process 800 includes multiple attributes that can be used to group the input data. Examples of such attributes include data type (e.g., indoor air temperature, temperature setpoint, outdoor air temperature, energy used by HVAC, etc.), corresponding zone to which the data applies (e.g., zone A, zone B, zone C, etc.), zone group (if the corresponding zone is assigned to a zone group), timestamp, data value, unit of measure, or other attributes that provide context or semantic information for the raw data values. In some embodiments, user input data is provided for initial configurations of zone groupings. The initial configuration data can be a zone size for optimization. The user input data indicates target zone sizes (e.g., amount of equipment or area) in some embodiments. The user input data combined with equipment data (e.g., piping data) can be used to make zone groupings and hence models. The piping data is refrigerant piping data in some embodiments and can indicate location or equipment that is connected together.

In some embodiments, the input data to process 800 is grouped into a set of samples for each building zone. Each sample may include a timestamp, an attribute indicating the building zone to which the sample applies, and a value for each of the different data types. For example, a particular sample may correspond to "zone A" and may include a value of historical indoor air temperature, historical temperature setpoint, historical outdoor air temperature, and historical energy used by HVAC at a particular time. Accordingly, each sample may include of the relevant zone data (i.e., a value for each input data type) for a particular zone at a particular time.

Step 802 involves grouping each type of zone data collected by zone data collector 404 into a particular block of data for each type of zone data over a predetermined time period for each particular zone, according to some embodiments. For example, a week's work of data collection including seven data samples (one data sample taken for each day of the week) of historical indoor air temperature for zone A may be blocked together into a single block. In some embodiments, the predetermined time period for which data samples are grouped together is configurable based on user input. For example, a user may elect to block a month's worth of samples or a year's worth of samples.

In some embodiments, step 802 involves grouping samples of zone data for zones i=1:N into K blocks of size T, where N is the total number of zones in a structure, K is the total number of blocks of data samples for each zone i, and T is the total number of data samples within each block collected for each zone. N, K or T can be provided as user input data. In some embodiments, each data sample t includes multiple types of zone data points associated with each zone i. For example, data sample t may include a setpoint temperature value of zone i, an indoor air temperature of zone i, and an energy usage by zone i. In some embodiments, a user inputs the number of desired blocks K. Further, in some embodiments, a user inputs the number of desired data samples T to be included in each block k. Given the blocks k=1: K and block k contains T data samples, the set of samples t assigned to block k can be determined with the following equation:

$$t = (k * T):((k + 1) * T) - 1$$

For example, using the previous equation, suppose that a user inputs that each block contains 2 data samples (such that that T=2). The data samples t=2:3 (i.e., the second and third samples) are blocked into block k=1 for each zone. Accordingly, the data samples t=4:5 (i.e., the fourth and fifth samples) for zones are blocked into block k=2 for each zone.

The K data blocks including T data samples generated in step 802 are each averaged in step 804, according to some embodiments. In some embodiments, each type of zone data included in each block K is averaged to generate an average of each type of zone data for each zone. For example, suppose that data sample t includes values of a setpoint temperature zone i, an indoor air temperature of zone i, and an energy usage by zone i. Each different value for zone i may be averaged for each block K using the following equation:

$$\overline{d}_{k,i} = \frac{1}{T}\sum_{t=1}^{T} d_{t,i}$$

In the previous equation, $\overline{d}_{k,i}$ is the average of data type d (e.g., indoor air temperature, temperature setpoint, outdoor air temperature, etc.) of block k for zone i (where the total number of data types d=1: D included in data sample t), T is the number of data samples included in block k for zone i, and $d_{t,i}$ is the value of data type d included in data sample t for zone i. In some embodiments, the data types D included in data samples T includes values of historical indoor air temperature, historical temperature setpoint, and historical energy usage. In some embodiments, the output of step 804 includes averages for each data type d of each block k for zone i.

Process 800 proceeds with step 806, according to some embodiments. In some embodiments, step 806 involves selecting one or more key features of each zone for use in the clustering algorithm of step 808. The one or more key features selected for each zone in step 808 are used to identify correlations between different types of data included in the one or more block averages calculated for each zone in step 804, according to some embodiments. Selected key features may include one or more block averages calculated in step 804 and/or further computations using the various block averages calculated in step 804. For example, a selected key feature in step 806 may include subtracting the average historical temperature setpoint calculated in step 804 from the average historical indoor air temperature calculated in step 804 in order to calculate a difference between the average historical temperature and the average historical air temperature. In some embodiments, selecting key features in step 808 identifies correlations between the one or more block averages calculated in step 804 and the operating state of one or more zones. For example, zone A may be identified as always operating in a heating mode when the historical outdoor air temperature is 45 degrees F. or less.

Another example may include collecting the block average of energy used by HVAC devices to operate the HVAC devices based on average historical temperature setpoints in one or more zones. In some embodiments, the selected key feature includes historical operating mode determined by energy consumption for each zone. For example, if the zone data includes energy consumption values for zone i greater than 1 such that $Q_{HVAC,i}>1$, then zone i may be identified as historically operating in a heating mode. In another example, if the zone data includes energy usage values for zone i less than −1 such that $Q_{HVAC,i}<-1$, then zone i may be identified as historically operating in a cooling mode. In yet another example in which $Q_{HVAC,i}=0$, zone i may be identified as a historically operating in an "off" mode such that no energy is consumed by zone i. The examples of selected key features are not intending to be limiting. In some embodiments, a user inputs one or more selected key features in step 806.

Step 806 is shown to output the one or more selected key features for use in step 808, according to some embodiments. In step 808, a clustering algorithm is applied to the zone data included in the selected key features in order to generate zone groups, according to some embodiments. Step 808 is also shown to receive a desired number of groups (e.g., number of groups of zones) as an input, according to some embodiments. In some embodiments, the number of groups are inputted by a user. For example, a user may input 4 groups into which the N zones should be grouped.

In some embodiments, step 808 involves zone grouping generator module 406 generating zone groupings by applying any variety of clustering algorithms to the selected key features identified and/or calculated in step 806. In general, a clustering algorithm collects a set of data samples into a predetermined number of groups containing relatively similar data samples. Some well-known clustering algorithms includes hierarchical clustering, k-means clustering, and simple expectation maximum, according to some embodiments. In some embodiments, one clustering algorithm is applied to a single type of zone data (e.g., zone temperature setpoint, zone indoor air temperature, etc.) to generate a zone grouping. In some embodiments, two or more clustering algorithms are applied to a single type of zone data to generate multiple zone groupings.

In some embodiments, the zone groupings use user defined groups that are based setup schedules for temperature setpoint, on/off times, or other parameters. The user defined groups provide an initial level of configuration, however, there is no limit to how small or big the groups can be. In some examples, the system details are used to split/combine groups into a range that is specified to give the modeling/asset allocator the best chance of success. For example, a range is 5 to 20 zones in a zone group. If the user has specified 4 groupings each with 3 zones and 2 of those groups are from one system and the other 2 are from a second system, the two zone groups are deifned each with 6 zones each with an isolated system. In another example, if a group had 30 zones made up of two systems, the zones would be split into 2 zone groups with 15 zones assuming the systems are the same size. If all the user groupings fall within the 5 to 20 range, the system details are not used in some embodiments.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for a building control system, the controller comprising one or more processors and memory storing instructions that, when executed by the one or more processors, cause the one or more processors to perform operations comprising:

receiving user inputs comprising a target size for groupings of zones and receiving piping data of a plurality of zones;

generating, using the piping data, the groupings of zones according to the target size; and generating a model for a particular zone group of the groupings of zones using the user inputs and the piping data, the particular zone group comprising a portion of the plurality of zones.

2. The controller of claim 1, wherein the operations further comprise using location data to identify the groupings of zones.

3. The controller of claim 1, wherein the piping data comprises refrigerant piping data.

4. The controller of claim 1, wherein the user inputs comprise predefined groupings of zones.

5. The controller of claim 1, wherein additional data associated with the plurality of zones is used for the model and comprises at least one of:

one or more historical zone temperature set points of the plurality of zones;

one or more historical zone operating modes of the plurality of zones; and one or more historical energy consumption values of the plurality of zones.

6. The controller of claim 5, wherein the additional data associated with the plurality of zones is processed by:

grouping each type of data included in the data for each of the plurality of zones over a predetermined time period to generate a plurality of data blocks for each of the plurality of zones; and selecting one or more key features associated with the plurality of data blocks.

7. The controller of claim 5, wherein the piping data associated with the plurality of zones is processed by:

selecting one or more clustering algorithms to identify one or more clusters comprising the piping data associated with the plurality of zones; and generating the particular zone group based on the one or more clusters comprising the piping data associated with the plurality of zones.

8. The controller of claim 1, the operations further comprising a system identification process to generate the model based on the particular zone group.

9. The controller of claim 1, the operations further comprising generating a particular grouping of zones defining a plurality of zone groups and specifying which of the plurality of zones are grouped together to form each of the plurality of zone groups.

10. A controller for a building control system, the controller comprising one or more processors and memory storing instructions that, when executed by the one or more processors, cause the one or more processors to perform operations comprising:

receiving user inputs comprising a target size for groupings of zones;

receiving piping data associated with equipment in a plurality of zones;

generating one or more zone groupings according to the target size based at least in part on the piping data associated with the plurality of zones, each of the one or more zone groupings defining a plurality of zone groups and specifying which of the plurality of zones are grouped together to form each of the plurality of zone groups;

generating a model for a particular zone group; and using the model for the particular zone group to generate one or more control signals configured to operate equipment of the building control system to provide heating or cooling to the plurality of zones.

11. The controller of claim 10, the operations comprising:

identifying the plurality of zones within a building;

collecting data associated with the plurality of zones within the building;

analyzing the data; and generating the one or more zone groupings based on the collected data, each of the one or more zone groupings specifying which of the plurality of zones are grouped together to form each of the plurality of zone groups.

12. The controller of claim 11, wherein the collected data is associated with the plurality of zones within the building, the collected data comprising at least one of:

one or more historical zone temperature set points of the plurality of zones;

one or more historical operating models of the plurality of zones; and one or more energy consumption values of the plurality of zones.

13. The controller of claim 12, the operations comprising:

blocking each type of data included in a dataset for each of the plurality of zones over a predetermined time period to generate a plurality of data blocks for each of the plurality of zones; and selecting one or more key features associated with the plurality of data blocks.

14. The controller of claim 13, the operations comprising generating using system identification the model based on the particular zone grouping.

15. A controller for a building control system, the controller comprising one or more processors configured to:

receive user input data associated with an initial configuration of infrastructure serving a plurality of zones, the user input data comprising a target size for groupings of zones;

generate one or more zone groupings according to the target size based at least in part on equipment data associated with the plurality of zones, each of the one or more zone groupings defining a plurality of zone groups and specifying which of the plurality of zones are grouped together to form each of the plurality of zone groups;

generate a model for a particular zone group; and use the model for the particular zone group to generate one or more control signals configured to operate equipment of the building control system to provide heating or cooling to the plurality of zones.

16. The controller of claim 15, further comprising performing system identification process to generate the model based on the particular zone group.

17. The controller of claim 15, wherein the equipment data is fluid medium data.

18. The controller of claim 15, further comprising using location data to identify the groupings of zones.

* * * * *